(12) United States Patent
Yamamoto et al.

(10) Patent No.: US 8,039,137 B2
(45) Date of Patent: Oct. 18, 2011

(54) BATTERY COOLING DEVICE, AIR FLOW CONTROL DEVICE, AND COMPUTER READABLE MEDIUM

(75) Inventors: Takao Yamamoto, Hirakata (JP); Norito Yamabe, Toyohashi (JP)

(73) Assignee: Panasonic EV Energy Co., Ltd., Kosai-shi (JP)

( * ) Notice: Subject to any disclaimer, the term of this patent is extended or adjusted under 35 U.S.C. 154(b) by 1163 days.

(21) Appl. No.: 11/811,709

(22) Filed: Jun. 11, 2007

(65) Prior Publication Data

US 2007/0298316 A1 Dec. 27, 2007

(30) Foreign Application Priority Data

Jun. 22, 2006 (JP) .................................. 2006-172663
Mar. 9, 2007 (JP) .................................. 2007-060778

(51) Int. Cl.
*H01M 2/00* (2006.01)
*H01M 10/50* (2006.01)
(52) U.S. Cl. .................................. 429/62; 429/61
(58) Field of Classification Search .................... 429/61, 429/62

See application file for complete search history.

(56) References Cited

U.S. PATENT DOCUMENTS

2006/0036883 A1 * 2/2006 Hashizumi et al. ........... 713/300

FOREIGN PATENT DOCUMENTS

| JP | 8148190 A | 6/1996 |
| JP | 9092347 A | 4/1997 |
| JP | 10-064598 | * 3/1999 |
| JP | 2005-063689 | * 10/2005 |

* cited by examiner

*Primary Examiner* — Helen O Conley
(74) *Attorney, Agent, or Firm* — Christensen O'Connor Johnson Kindness PLLC (57) ABSTRACT

In a battery cooling device for cooling a battery with air from a cooling unit, such as a cooling fan, the air flow of the cooling unit is optimally controlled. A air flow control device calculates a calorific value of the battery based on an internal resistance of the battery and a charge/discharge current measured by a current measurement unit, calculates the difference as a differential temperature between battery temperature measured by a battery temperature measurement unit and ambient temperature measured by an ambient temperature measurement unit, and controls the air flow of the cooling fan on the basis of the calculated calorific value and the differential temperature.

14 Claims, 5 Drawing Sheets

BATTERY COOLING DEVICE, AIR FLOW CONTROL DEVICE, AND COMPUTER READABLE MEDIUM

PRIORITY INFORMATION

This application claims priority to Japanese Patent Application No. 2006-172663 filed on Jun. 22, 2006 and Japanese Patent Application No. 2007-60778 filed on Mar. 9, 2007, which are incorporated herein by reference in its entirety.

BACKGROUND OF THE INVENTION

1. Field of the Invention

The present invention relates to a technique for cooling a battery by blowing air, such as from a cooling fan.

2. Description of the Related Art

Batteries are known to generate Joule heat when being charged or discharged. To prevent an excessive rise in battery temperature due to Joule heat, known battery cooling devices cool batteries by blowing cooling air from a cooling fan.

Japanese Patent Laid-Open Publication No. Hei 8-148190 discloses a battery cooling device for detecting discharge current flowing to a battery supply line by a current sensor, calculating the calorific value of the battery from the detected current value and a pre-stored battery internal resistance value, and supplying cooling air to the battery by controlling a cooling air flow of a cooling fan based on an output in accordance with the calculated calorific value. Furthermore, Japanese Patent Laid-Open Publication No. Hei 8-148190 discloses a battery cooling device for estimating the battery temperature at the end of discharge on the basis of the remaining capacity of the battery and the battery temperature rising rate and controlling the cooling air flow of the cooling fan on the basis of the estimated battery temperature.

Moreover, Japanese Patent Laid-Open Publication No. Hei 9-92347 discloses a battery cooling device for controlling a cooling air flow of a cooling fan on the basis of an estimated internal temperature by estimating the internal temperature of a battery on the basis of the surface temperature of the battery and the calorific value of the battery.

In this manner, the cooling air flow of the cooling fan is controlled on the basis of the battery temperature and calorific value in Japanese Patent Laid-Open Publication No. Hei 8-148190 and Japanese Patent Laid-Open Publication No. Hei 9-92347.

However, the cooling air flow required to cool the battery is influenced not only by parameters indicating the state of the battery, such as battery temperature and calorific value, but also by the surrounding environment of the battery. Namely, the ease of cooling the battery changes depending on the surrounding environment of the battery. Therefore, the cooling air flow of the cooling fan may be excessive or insufficient if the cooling air flow of the cooling fan is determined only by parameters indicating the state of the battery, such as battery temperature and calorific value.

SUMMARY OF THE INVENTION

It is therefore an object of the present invention in the battery cooling device for cooling the battery with air from the cooling unit, such as a cooling fan, to optimally control the air flow of the cooling unit.

A battery cooling device includes a cooling unit for cooling a battery by supplying air to the battery, a current measurement unit for measuring charge/discharge current of the battery, a battery temperature measurement unit for measuring battery temperature of the battery, an ambient temperature measurement unit for measuring ambient temperature surrounding the battery, and a control unit for calculating a differential temperature between the battery temperature and the ambient temperature and calculating a calorific value of the battery on the basis of internal resistance of the battery and the charge/discharge current and controlling the air flow of the cooling unit on the basis of the differential temperature and the calorific value.

According to one aspect of the battery cooling device relating to the present invention, the control unit specifies an air flow by referencing an air flow map pre-stored in a storage unit and uniquely defining the air flow on the basis of differential temperature and calorific value and controls the cooling air flow of the cooling unit on the basis of the specified air flow.

According to one aspect of the battery cooling device relating to the present invention, the air flow map includes multiple air flow regions divided into gradually predetermined air flows and the control unit specifies air flow regions to include points on the air flow map determined on the basis of the calculated differential temperature and the calculated calorific value and controls the air flow of the cooling unit on the basis of specified air flow regions.

According to one aspect of the battery cooling device relating to the present invention, the control unit suppresses the air flow of the cooling unit when a calculated differential temperature is less than or equal to a predetermined threshold temperature and a calculated calorific value is included in a predetermined calorific range corresponding to the calculated differential temperature.

According to one aspect of the battery cooling device relating to the present invention, the control unit suppresses the cooling air flow of the cooling unit when a calculated calorific value is less than or equal to a predetermined threshold calorific value and a calculated differential temperature is included in a predetermined differential temperature range corresponding to the calculated calorific value.

According to one aspect of the battery cooling device relating to the present invention, the threshold temperature and the calorific value range or the threshold calorific value and the differential temperature range are values determined on the basis of a state of charge of said battery.

According to one aspect of the battery cooling device relating to the present invention, the control unit limits suppression of air flow of the cooling unit when a value indicating a state of charge of said battery is less than or equal to a predetermined lower limit threshold or greater than or equal to a predetermined upper limit threshold.

According to one aspect of the battery cooling device relating to the present invention, the control unit calculates calorific value and adjusts the air flow of the cooling unit for every predetermined period having a duration less than or equal to a predetermined heat conduction period indicating a period from a point when generated heat from a heat source of the battery to a point when a change in battery temperature due to the generated heat is measured by the battery temperature measurement unit.

According to one aspect of the battery cooling device relating to the present invention, the cooling unit calculates the calorific value on the basis of an average value of charge/discharge current values measured within said predetermined period.

According to one aspect of the battery cooling device relating to the present invention, the control unit controls the air flow of the cooling unit to achieve a predetermined maximum air flow regardless of calculated differential temperature value when the battery temperature exceeds a predetermined upper limit threshold temperature.

According to the present invention, the air flow of the cooling unit for cooling the battery can be optimally controlled.

DETAILED DESCRIPTION OF THE PREFERRED EMBODIMENTS

The best mode (referred to hereinafter as the embodiment) for carrying out the present invention will be described hereinafter with reference to the attached drawings.

Figure 1:
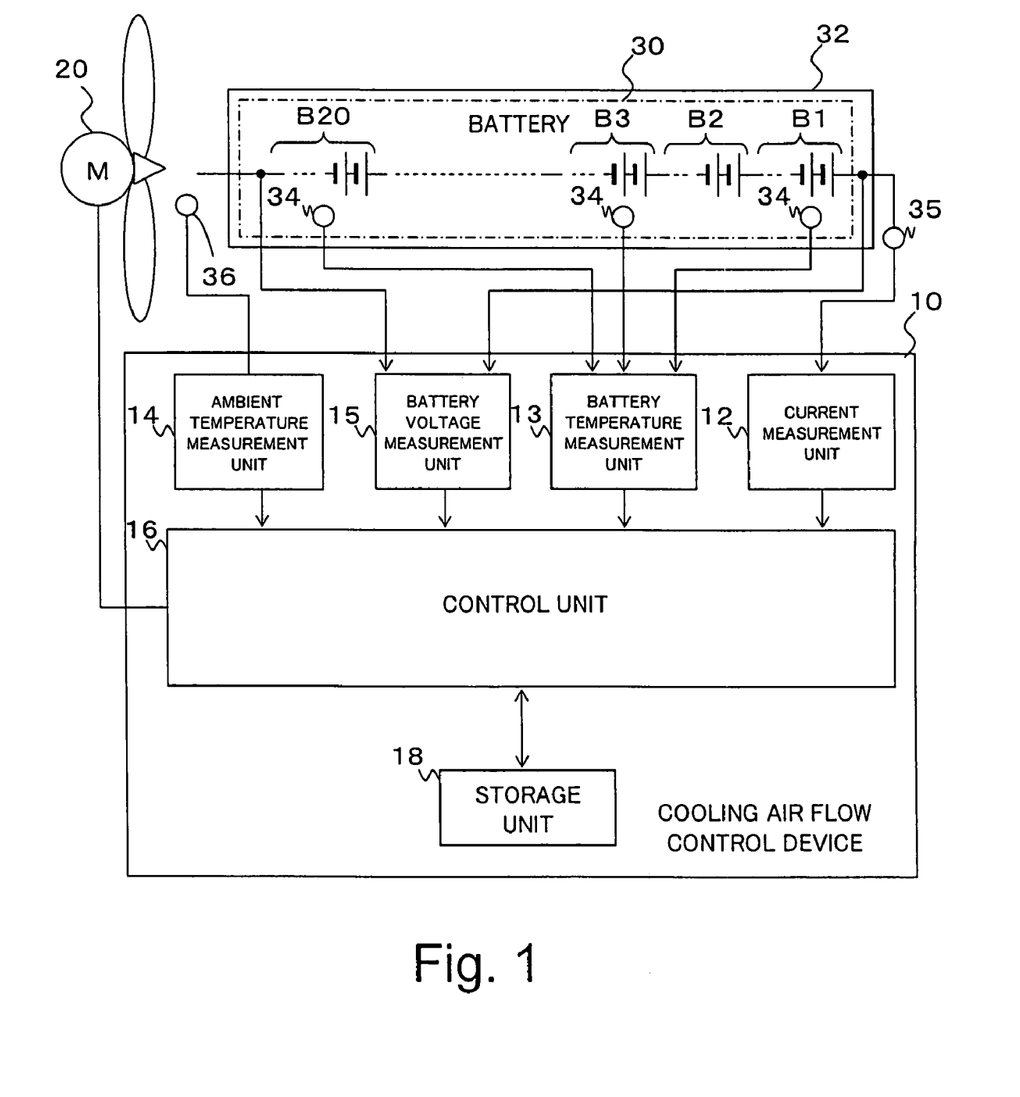
FIG. 1 illustrates a configuration of a battery cooling device in the embodiment.

FIG. 1 illustrates a configuration of a battery cooling device in the embodiment. The battery cooling device includes a cooling fan 20 as a cooling unit: for supplying cooling air to a battery 30 for the purpose of cooling the battery 30 and a cooling air flow control unit 10 for adjusting the cooling air flow of the cooling fan 20. The cooling air flow control unit 10, for example, forms a part within a battery electronic control unit (battery ECU). The battery cooling device and the battery 30, for example, are mounted into an electric vehicle or hybrid electric vehicle, and a driving motor receives power from the battery 30 and becomes a driving power source to drive the electric vehicle or hybrid electric vehicle.

The battery 30 is configured by connecting battery blocks B1 to B20 in series as shown in FIG. 1. The battery blocks B1 to B20 are contained in a battery case 32. The battery blocks B1 to B20 are each configured by electrically connecting two battery modules in series, and each battery module is further configured by electrically connecting six cells in series. A nickel-metal hydride battery or a lithium ion battery can be used for the cells. It should be noted that the numbers of battery blocks, battery modules, and cells are not particularly limited. The configuration of the battery 30 is also not limited to the aforementioned example.

Furthermore, multiple temperature sensors 34 are located within the battery case 32. The multiple temperature sensors 34 are located so that one temperature sensor 34 is located for every group, where a group includes multiple battery blocks having relatively close temperatures or one battery block having a relative temperature difference with an other battery block. Furthermore, the division into groups is performed by measuring the temperature of each battery block in advance, such as by experimentation. The embodiment includes M (where M is an integer) temperature sensors 34 and the temperature detected by each temperature sensor 34 is respectively expressed as temperature Tb(1) to temperature Tb(M).

The cooling air flow control unit 10 includes a current measurement unit 12, a battery temperature measurement unit 13, an ambient temperature measurement unit 14, a battery voltage measurement unit 15, a control unit 16, and a storage unit 18.

The current measurement unit 12 measures a charge/discharge current I during charging or discharging of the battery 30. The current measurement unit 12 in the embodiment converts an analog signal, which is output by a current sensor 35, into a digital signal, on the basis of which current data is generated and output to the control unit 16 to specify a current that is input by the battery 30 during charging and a current that is output from the battery 30 during discharging. Furthermore, the current measurement unit 12 generates current data, for example, with charging as negative and discharging as positive. The output of current data from the current measurement unit 12 to the control unit 16 is performed at a preset period (such as 100 ms) and the control unit 16 stores the current data into the storage unit 18.

The battery temperature measurement unit 13 measures the battery temperature of the battery 30. The embodiment converts an analog signal, which is output by each temperature sensor 34 located at every group, into a digital signal. On the basis of this, battery temperature data by group is generated to specify the battery temperature by group and this is output to the control unit 16. The control unit 16 obtains the maximum value of the temperature Tb(1) to temperature Tb(M) shown in the input temperature data by group to obtain the battery temperature Tb, generates battery temperature data to specify the obtained battery temperature Tb, and stores the data into the storage unit 18. The output of temperature data by group from the battery temperature measurement unit 13 to the control unit 16 is performed at a preset period and the storage of the battery temperature data into the storage unit 18 by the control unit 16 is also performed at a preset period (such as 100 ms).

The ambient temperature measurement unit 14 converts an analog signal that is output by a temperature sensor 36, which detects an ambient temperature Ta surrounding the battery 30, into a digital signal, on the basis of which ambient temperature data is generated and output to the control unit 16 to specify the battery ambient temperature Ta. The output of ambient temperature data from the ambient temperature measurement unit 14 to the control unit 16 is also performed at a preset period (such as 100 ms) and the control unit 16 stores the ambient temperature data into the storage unit 18. The temperature sensor 36 is installed near the inlet (not shown) for the purpose of supplying cooling air from the cooling fan 20 to the battery 30.

The battery voltage measurement unit 15 measures the block terminal voltages Vb(1) to Vb(20) of the battery blocks B1 to B20. The battery voltage measurement unit 15 generates voltage data to specify the block terminal voltages Vb(1) to Vb(20) and outputs the data to the control unit 16. The control unit 16 totals the block terminal voltages to obtain a terminal voltage V of the battery 30. The output of voltage data from the battery voltage measurement unit 15 to the control unit 16 is performed at a preset period (such as 100 ms) and the control unit 16 stores the voltage data into the storage unit 18.

The control unit 16 determines a fan drive mode defining the cooling air flow on the basis of physical values related to the battery 30 acquired from various sensors and controls the cooling fan 20 to achieve a cooling air flow corresponding to the determined fan drive mode.

Figure 2:
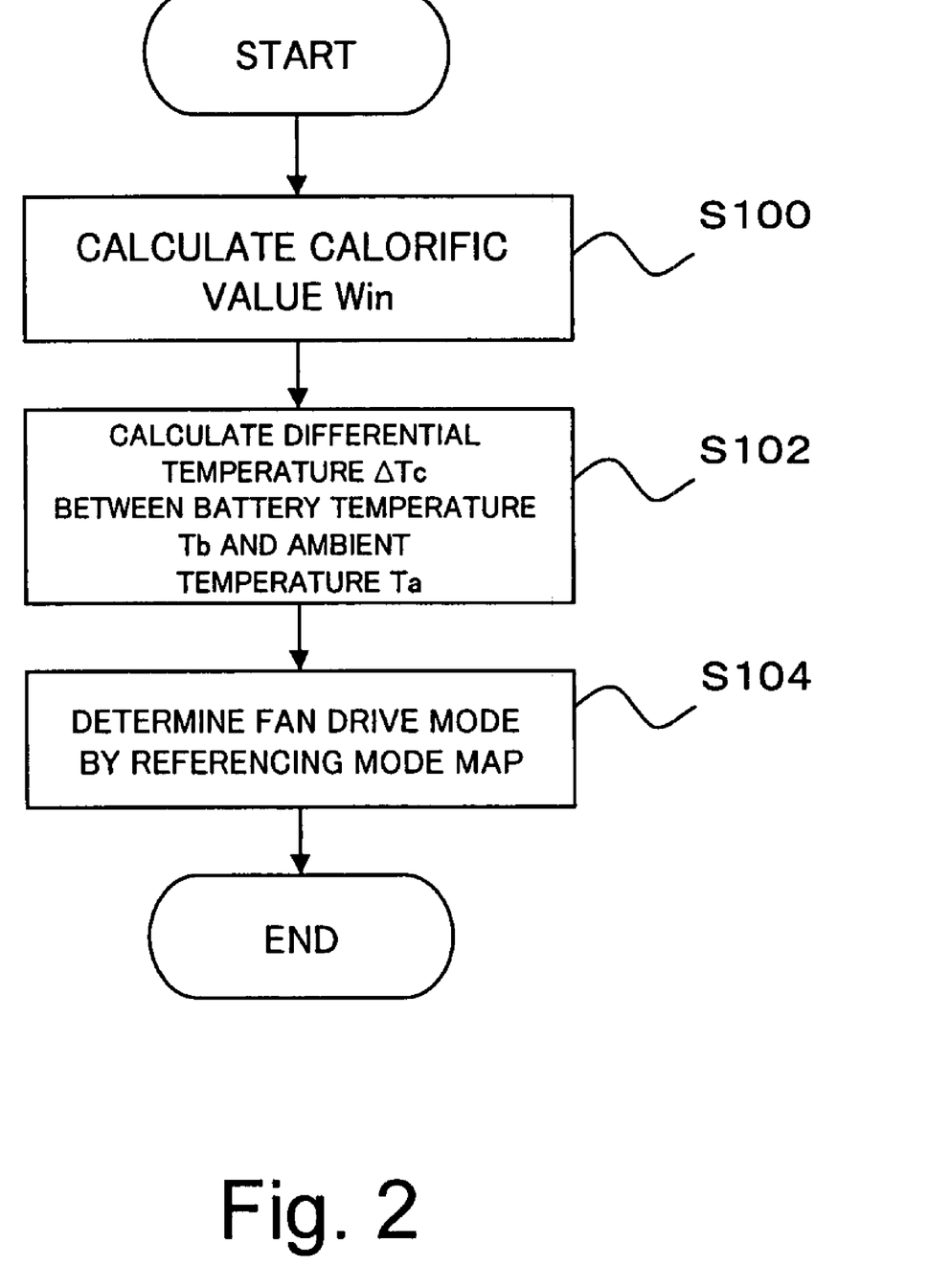
FIG. 2 is a flowchart showing a procedure when a control unit determines a fan drive mode.

In the battery cooling device configured as described above, the control unit 16 determines the fan drive mode on the basis of the flowchart shown in FIG. 2.

In FIG. 2, the control unit 16 first calculates (S100) a calorific value Win of the battery 30. The control unit 16 acquires the charge/discharge current I and an internal resistance R of the battery 30 pre-stored in the storage unit 18 or calculated by a known method from current data and voltage data and calculates the calorific value Win based on formula (1).

$$Win = I^2 \times R \tag{1}$$

Figure 3:
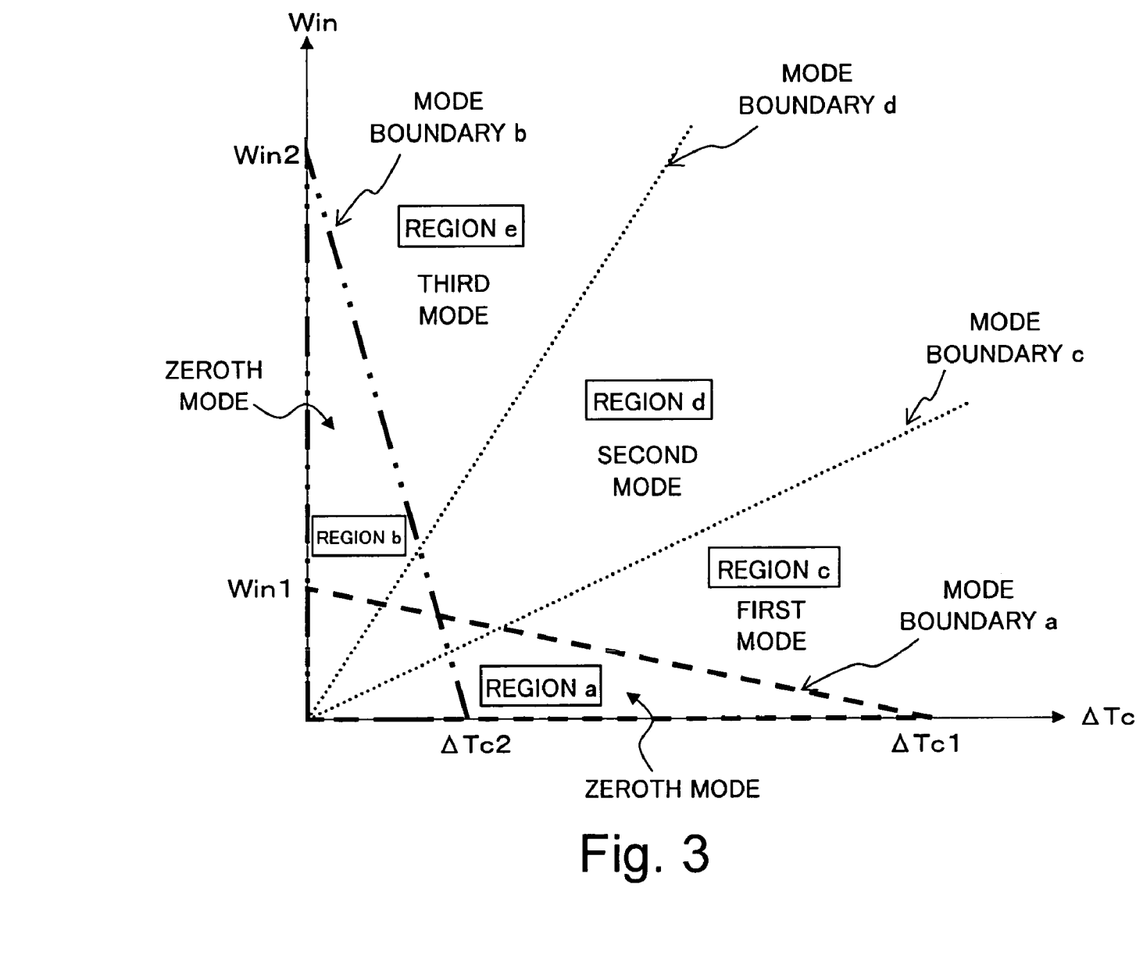
FIG. 3 shows one example of a mode map to be referenced when the control unit determines a fan drive mode.

Furthermore, the control unit 16 acquires the battery temperature Tb and the ambient temperature Ta from the storage unit 18 and calculates (S102) a differential temperature $\Delta Tc$ ($\Delta Tc = Tb - Ta$), references a mode map shown in FIG. 3 and pre-stored in the storage unit 18, and determines the fan drive mode on the basis of the calorific value Win and the differential temperature $\Delta Tc$. Here, the mode map refers to a cooling air flow map uniquely defining a fan drive mode, namely, a cooling air flow, when the calorific value Win and the differential temperature $\Delta Tc$ are defined. As shown in FIG. 3, the mode map defines a region for every preset fan drive mode and the fan drive mode, which corresponds to the region including a point that is defined by the calorific value Win and the differential temperature $\Delta Tc$, is selected as the mode to be executed. The cooling fan in the embodiment is driven and controlled in four modes, from a zeroth mode to a third mode. One cooling air flow is predefined for each mode and the cooling fan 20, under control of the cooling air flow control device 10, is driven at a cooling air flow corresponding to the specified mode. The zeroth mode is defined as having a cooling air flow of zero. If the zeroth mode is specified, the cooling fan 20 is in a stopped state. Furthermore, the first to third modes are respectively defined to achieve cooling air flows of low air flow, medium air flow, and high air flow.

Region a in FIG. 3 shows a region where the calorific value Win is small and where it is not necessary to cool the battery 30. The zeroth mode is assigned to this region in which the cooling fan 20 is not driven, namely, the cooling air flow is zero. Similarly, in region b, since the calorific value Win is large and the cooling effect is poor despite the small differential temperature $\Delta Tc$, the zeroth mode is assigned.

Region a shows a region where the differential temperature $\Delta Tc$ is less than or equal to a first threshold temperature $\Delta Tc1$ and where the calorific value Win is within a predetermined calorific value range defined to correspond to the differential temperature $\Delta Tc$. More specifically, the region is delimited by a line connecting the first threshold temperature $\Delta Tc1$ of the differential temperature $\Delta Tc$ and a first threshold calorific value Win1, the differential temperature $\Delta Tc$ axis, and the calorific value Win axis (region enclosed by the broken line (mode boundary line a) in FIG. 3). Here, the first threshold temperature $\Delta Tc1$ indicates a lower limit differential temperature $\Delta Tc$ where the battery 30 can be cooled at high efficiency despite the calorific value Win being small. Namely, if the differential temperature $\Delta Tc$ is larger than the first threshold temperature $\Delta Tc1$, the cooling fan 20 is driven since cooling of the battery 30 is possible at high efficiency. Furthermore, even if the present battery temperature Tb is high, the first threshold calorific value Win1 indicates an upper limit calorific value Win where the cooling fan 20 need not be driven since the present calorific value of the battery 30 is small. Namely, if the calorific value Win is smaller than the first threshold calorific value Win1, the cooling fan 20 is not driven.

On the other hand, region b shows a region where the calorific value is less than or equal to a second threshold calorific value Win2 and where the differential temperature $\Delta Tc$ is within a predetermined differential temperature range defined to correspond to the calorific value Win. More specifically, the region is delimited by a line connecting a second threshold temperature $\Delta Tc2$ and the second threshold calorific value Win2, the differential temperature $\Delta Tc$ axis, and the calorific value Win axis (region enclosed by the chain double-dashed line (mode boundary line b) in FIG. 3). Here, the second threshold temperature $\Delta Tc2$ indicates an upper limit differential temperature $\Delta Tc$ where the battery 30 cannot be cooled efficiently even by driving the cooling fan 20 since the difference between the battery temperature Tb and the ambient temperature Ta is small even though the calorific value Win is large. Namely, if the differential temperature $\Delta Tc$ is less than or equal to the second threshold temperature $\Delta Tc2$, the cooling fan 20 is not driven since the cooling efficiency is poor. Furthermore, although the difference between the battery temperature Tb and the ambient temperature Ta is small, the second threshold calorific value Win2 indicates a lower limit calorific value Win where it is necessary to drive the cooling fan 20 despite poor cooling efficiency. Namely, if the calorific value Win is greater than or equal to the second threshold calorific value Win2, the cooling fan 20 is driven despite poor cooling efficiency.

In FIG. 3, region c is a region delimited by the mode boundary line c and the differential temperature $\Delta Tc$ axis minus region a and where the cooling fan 20 is driven in the first mode (low air flow). Furthermore, region d is a region delimited by the mode boundary line c and the mode boundary line d minus region a and region b and where the cooling fan 20 is driven in second mode (medium air flow). Even further, region e is a region delimited by mode boundary line d and the calorific Win axis minus region b and where the cooling fan 20 is driven in the third mode (high air flow).

As described hereinabove, the control unit 16 in the embodiment references the mode map, determines the fan drive mode on the basis of the calorific value Win and the differential temperature $\Delta Tc$, and drives the cooling fan 20 to achieve a cooling air flow corresponding to the determined mode.

The aforementioned $\Delta Tc1$, $\Delta Tc2$, Win1, and Win2 are obtained respectively in advance, such as by experimentation. Furthermore, although the boundaries of the aforementioned regions are simply delimited by straight lines, detailed experiments may be conducted and the regions may instead be delimited by curved lines.

Furthermore, when the difference between the battery temperature Tb and the ambient temperature Ta is small and the battery temperature Tb is excessively high in the zeroth mode on the mode map, there is a risk of this becoming a factor in shortening the life of the battery 30. Thus, an upper limit threshold temperature Tbmax is preset as a maximum permissible battery temperature, and if the battery temperature Tb exceeds the upper limit threshold temperature Tbmax, the cooling fan 20 may be driven in the third mode, for example, regardless of the value of the differential temperature $\Delta Tc$.

The fan drive mode setting process shown in FIG. 3 is performed at a predetermined period P. If this period P is excessively long, the change in temperature of the battery 30 cannot be handled and there is a risk of the cooling fan 20 being excessively driven or the drive being started late. Accordingly, in the embodiment, the period P is set by taking into consideration the period (referred to hereinafter as the heat conduction period $\tau$) it takes the heat generated within the battery 30 to reach the surface of the battery 30 and cause a temperature change to be detected by the temperature sensor 34, which detects the surface temperature of the battery 30. Namely, the period P is set to a value smaller than the heat conduction period τ. By setting the period P in this manner, an appropriate fan drive mode can be determined prior to a rise or fall in the surface temperature of the battery 30. The heat conduction period τ is a value that varies depending on the type and compositional member of the battery 30 and is obtained in advance, such as by experimentation.

Figure 4:
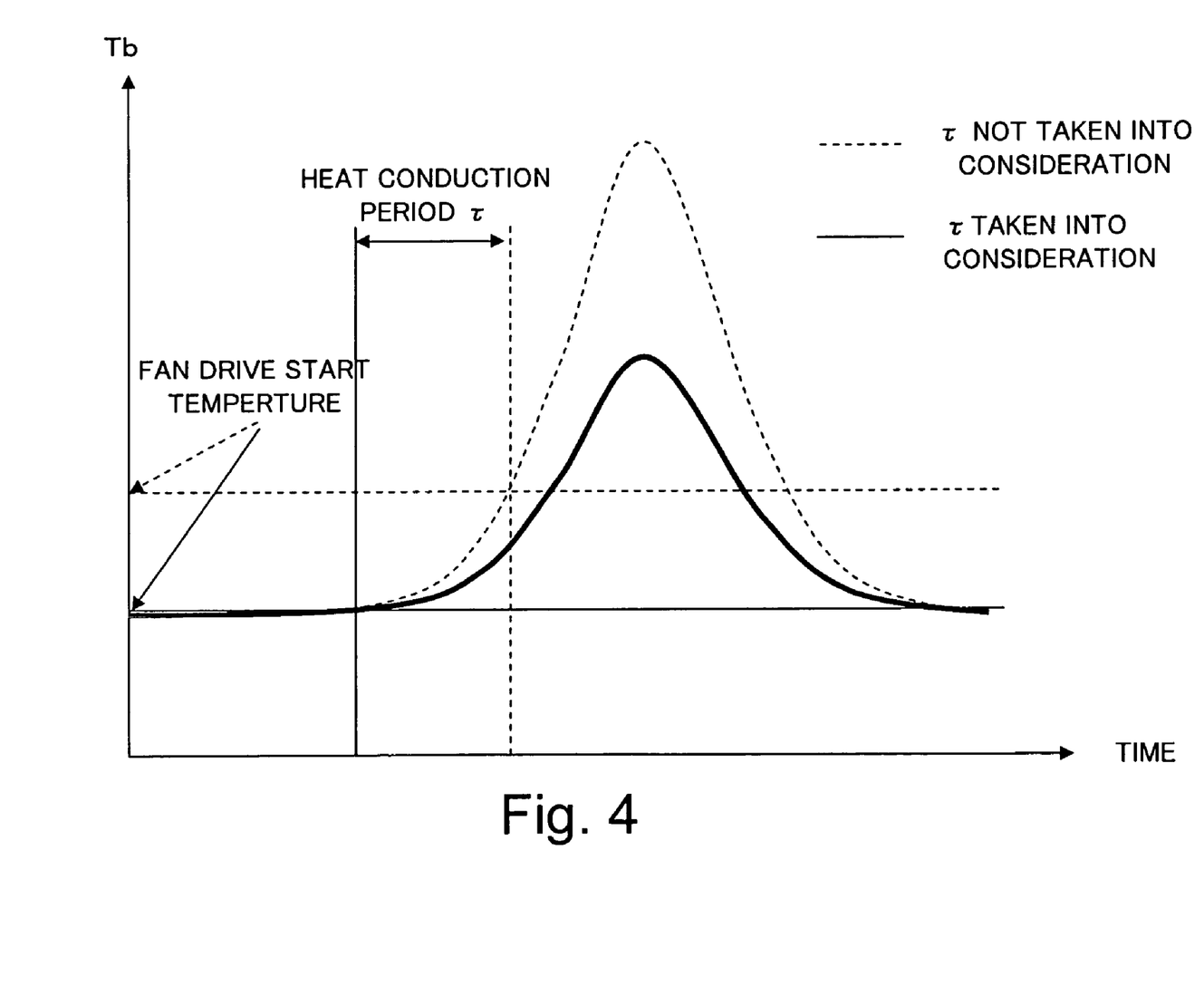
FIG. 4 illustrates the difference between a change in a battery temperature Tb over time when the fan drive mode is determined with thermal conduction period τ taken into consideration and a change in battery temperature Tb when the fan drive mode is determined without thermal conduction period τ taken into consideration.

FIG. 4 shows one example of a change in the battery temperature Tb over time when the fan drive mode is determined with the heat conduction period τ taken into consideration and a change in the battery temperature Tb over time when the fan drive mode is determined without the heat conduction period τ taken into consideration. As shown in FIG. 4, when the heat conduction period τ is taken into consideration, the fan drive mode corresponding to the change in battery temperature Tb can be quickly determined to make it possible to suppress a rise in the battery temperature Tb.

Furthermore, when the battery 30 is installed, for example, in a hybrid electric vehicle, the battery 30 repeatedly charges and discharges in short periods so that the value of the charge/discharge current I fluctuates considerably in short periods. Thus, for the charge/discharge current I, which is used when calculating the calorific value Win, it is preferable to use an average value of the charge/discharge current I measured in a predetermined period. At this time, it is preferable to obtain the average value of the charge/discharge current I with the aforementioned period P taken into consideration on the basis of the charge/discharge current I measured within period P and then calculate the calorific value Win on the basis of the average value.

Furthermore, hereinabove, the fan drive mode was determined on the basis of the calorific value Win, which is the joule heat generated from the battery 30. However, in addition to joule heat, the heat generated from the battery 30 also includes heat from chemical reactions of the active materials during charging and discharging. When the battery 30 is installed in a hybrid electric vehicle, the battery 30 is repeatedly charged and discharged at intervals of a few seconds and repeats heat generation and heat absorption. Thus, since the heat from the chemical reaction is normally cancelled from the heat generation and heat absorption, the influence is small even if this heat is ignored. However, for example, if the battery 30 is only charged or only discharged when the hybrid electric vehicle travels for a long period of time on continuous downhill or uphill grades, there are cases when the aforementioned cancellation of the heat from the chemical reaction due to heat generation and heat absorption does not occur. In such cases, when the fan drive mode is determined with only the joule heat taken into consideration, there is a risk the battery 30 cannot be cooled with an appropriate cooling air flow. Accordingly, the calorific value Win for the battery 30 may be obtained with more accuracy from the following formula (2).

$$Win = Wj + Wc = I^2 \times R + I \times (Tb + 273) \times \epsilon \quad (2)$$

Here, $\epsilon$ indicates an electromotive force temperature coefficient [V/K], which is a fixed value determined by the configuration and type of the battery 30 and is obtained in advance, such as by experimentation. Hereinabove, Wj indicates joule heat and Wc indicates the heat from chemical reaction.

By calculating the calorific value Win with the heat from chemical reaction taken into consideration, a more appropriate cooling air flow can be determined.

Figure 5:
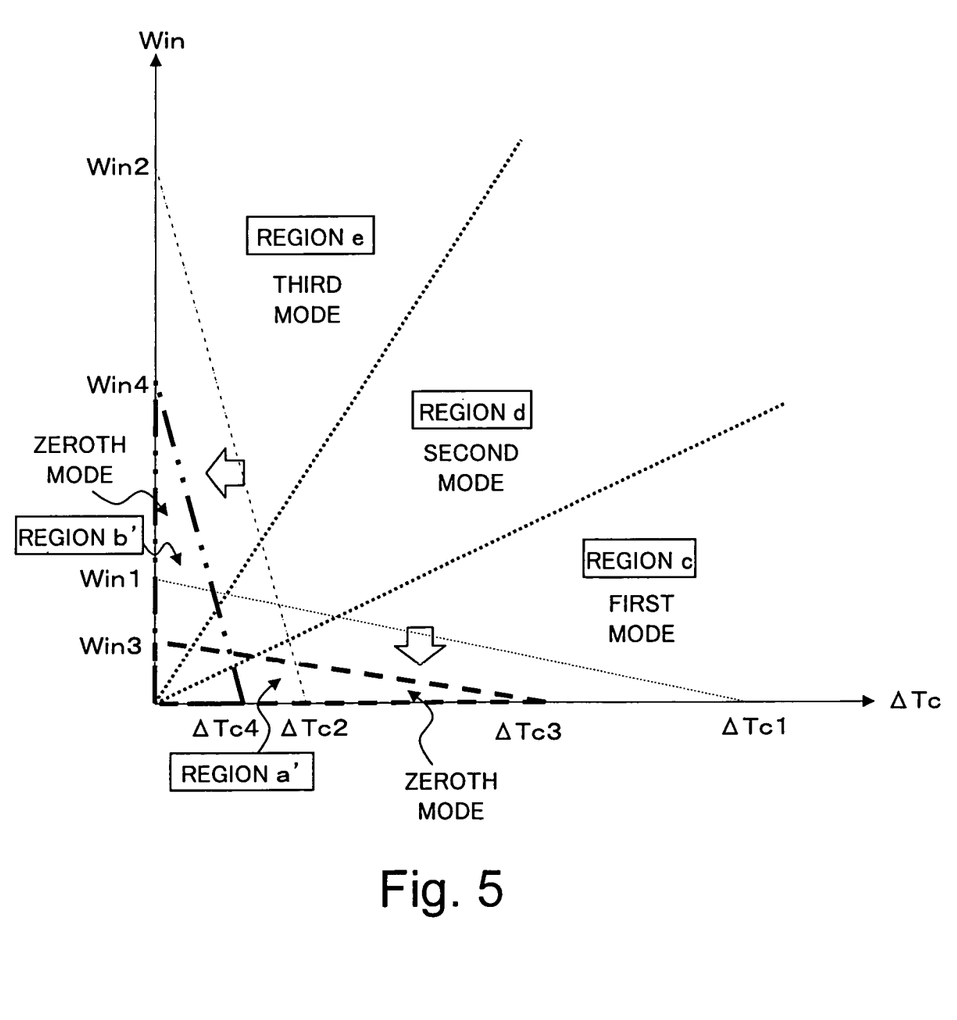
FIG. 5 shows one example of a mode map to be referenced when the control unit determines a fan drive mode with the charging state of the battery outside tolerance.

Furthermore, if the state of charge (SOC) of the battery 30 exceeds tolerance, for example, if the SOC is greater than or equal to an upper limit threshold (such as 80%) or less than or equal to a lower limit threshold (such as 20%), the heat generation of the battery 30 may increase compared to when the SOC is within tolerance. Namely, unlike the characteristic battery charging and discharging reactions, gas is generated from a side reaction of gas and the possibility of reaction heat based on this gas contributing to heat generation increases. More specifically, in the case of nickel hydride batteries, oxygen gas is generated from the positive electrode when overcharging and hydrogen gas is generated when over discharging, and these gases cause an instantaneous change in state at the negative electrode resulting in heat generation. Thus, if the SOC exceeds tolerance, it is preferable to drive the cooling fan 20 as much as possible. Namely, it is preferable not to perform suppression of the cooling air flow of the cooling fan 20 as much as possible. Accordingly, if the SOC exceeds tolerance, the control unit 16 may determine the fan drive mode by referencing the second mode map that has a narrow region (zeroth mode) where the cooling fan is not driven compared to when the SOC is within tolerance. FIG. 5 shows one example of the second mode map. Region a' and region b' in FIG. 5 are regions where the cooling fan is not driven when the SOC exceeds tolerance. Region a' is delimited by a line connecting a third threshold temperature $\Delta Tc3$, which is lower than a first threshold temperature $\Delta Tc1$, and a third threshold calorific value Win3, which is lower than a first threshold calorific value Win1, the differential temperature $\Delta Tc$ axis, and the calorific value Win axis. Region b' is delimited by a line connecting a fourth threshold temperature $\Delta Tc4$, which is lower than a second threshold temperature $\Delta Tc2$, and a fourth calorific value Win4, which is lower than a second threshold calorific value Win2, the differential temperature $\Delta Tc$ axis, and the calorific value Win axis. As with $\Delta Tc1$ and other values, $\Delta Tc3$, $\Delta Tc4$, Win3, and Win4 are also obtained respectively in advance, such as by experimentation.

Furthermore, multiple mode maps may be prepared in advance with changes to the range of the region (zeroth mode) where the cooling fan is not driven to correspond to the SOC and the control unit 16 may switch the mode map to be referenced to correspond to the SOC. In this case, the mode maps are created by measuring the calorific value of the battery 30 corresponding to a SOC in advance and narrowing the range of the region where the cooling fan is not to be driven as the calorific value increases. The control unit 16 obtains the SOC of the battery 30 using a known method on the basis of such information as battery voltage V, charge/discharge current I, battery temperature Tb, and so forth.

The cooling air flow control device can be realized by installing and executing a program on a microcomputer for implementing the processes shown in FIG. 2.

Namely, the microcomputer has a CPU, various types of memory, such as ROM, RAM, and EEPROM, and a communication bus and interface, and the CPU sequentially reads and executes an executable program that is stored in advance into ROM as firmware. The mode maps are stored in advance into memory, the CPU calculates the differential temperature $\Delta Tc$ on the basis of the battery temperature Tb and the ambient temperature Ta input from the temperature sensors via the interface and stored into memory and further calculates the calorific value Win on the basis of the charge/discharge current I input from the current sensor and stored into memory and the internal resistance R stored in advance into memory or calculated from the current data and the voltage data. Next, the CPU references the mode map, determines the fan drive mode on the basis of the calorific value Win and the differential temperature $\Delta Tc$, and drives the cooling fan to achieve the cooling air flow corresponding to the determined mode.

While there has been described what are at present considered to be preferred embodiments of the invention, it will be understood that various modifications may be made thereto, and it is intended that the appended claims cover all such modifications as fall within the true spirit and scope of the invention.

What is claimed is:

1. A battery cooling device comprising:
   a cooling unit for cooling a battery by supplying air to said battery;
   a current measurement unit for measuring charge/discharge current of said battery;
   a battery temperature measurement unit for measuring a battery temperature of a surface of said battery;
   an ambient temperature measurement unit for measuring ambient temperature for supplying cooling air to said battery;
   a storage unit having stored therein a battery charge/discharge current value, a battery surface temperature value, a battery internal resistance value, and an ambient cooling air temperature value; and
   a control unit configured to calculate a differential temperature between said battery surface temperature value and said ambient cooling air temperature value and configured to calculate a calorific value of said battery on the basis of said internal resistance value and said charge/discharge current value and further configured to control an air flow of said cooling unit on the basis of said calculated differential temperature and said calculated calorific value.

2. A battery cooling device according to claim 1, wherein:
   said control unit is configured to specify an air flow by referencing an air flow map pre-stored in said storage unit and uniquely defining a specified air flow on the basis of said calculated differential temperature and said calculated calorific value and said control unit is further configured to control said air flow of said cooling unit on the basis of said specified air flow.

3. A battery cooling device according to claim 2, wherein:
   said air flow map comprises a plurality of air flow regions divided into gradually predetermined air flows; and
   said control unit is configured to specify air flow regions to include points on said air flow map determined on the basis of said calculated differential temperature and said calculated calorific value and said control unit is further configured to control said air flow of said cooling unit on the basis of specified air flow regions.

4. A battery cooling device according to claim 1, wherein:
   said control unit is configured to suppress said air flow of said cooling unit when said calculated differential temperature is less than or equal to a predetermined threshold temperature and said calculated calorific value is included in a predetermined calorific range corresponding to said calculated differential temperature.

5. A battery cooling device according to claim 1, wherein:
   said control unit is configured to suppress said air flow of said cooling unit when said calculated calorific value is less than or equal to a predetermined threshold calorific value and said calculated differential temperature is included in a predetermined differential temperature range corresponding to said calculated calorific value.

6. A battery cooling device according to claim 4, wherein:
   said threshold temperature and said calorific value range are values determined on the basis of a state of charge of said battery.

7. A battery cooling device according to claim 5, wherein:
   said threshold calorific value and said differential temperature range are values determined on the basis of a state of charge of said battery.

8. A battery cooling device according to claim 4, wherein:
   said control unit is configured to limit said air flow of said cooling unit when a value indicating a state of charge of said battery is less than or equal to a predetermined lower limit threshold or greater than or equal to a predetermined upper limit threshold.

9. A battery cooling device according to claim 5, wherein:
   said control unit is configured to limit said air flow of said cooling unit when a value indicating a state of charge of said battery is less than or equal to a predetermined lower limit threshold or greater than or equal to a predetermined upper limit threshold.

10. A battery cooling device according to claim 1, wherein:
    said control unit is configured to calculate said calorific value and is configured to adjust said air flow of said cooling unit for every predetermined period having a duration less than or equal to a predetermined heat conduction period indicating a period from a point when generated heat from a heat source of said battery to a point when a change in battery temperature due to said generated heat is measured by said battery temperature measurement unit.

11. A battery cooling device according to claim 10, wherein:
    said control unit is configured to calculate said calorific value on the basis of an average value of charge/discharge current values measured within said predetermined period.

12. A battery cooling device according to claim 1, wherein:
    said control unit is configured to control said air flow of said cooling unit so as to achieve a predetermined maximum air flow regardless of said calculated differential temperature when said battery temperature value exceeds a predetermined upper limit threshold temperature.

13. An air flow control device for controlling an air flow of a cooling unit for supplying air to a battery to cool said battery, said air flow control device comprising:
    a current measurement unit for measuring charge/discharge current of said battery;
    a battery temperature measurement unit for measuring a battery temperature of a surface of said battery;
    an ambient temperature measurement unit for measuring ambient temperature for supplying cooling air to said battery;
    a storage unit having stored therein a battery charge/discharge current value, a battery surface temperature value, a battery internal resistance value, and an ambient cooling air temperature value; and
    a control unit configured to calculate a differential temperature between said battery surface temperature value and said ambient cooling air temperature value and configured to calculate a calorific value of said battery on the basis of said internal resistance value and said charge/discharge current value and further configured to control an air flow of said cooling unit on the basis of said calculated differential temperature and said calculated calorific value.

14. A computer readable medium storing a program causing a computer to execute a process for controlling an air flow of a cooling unit for supplying air to a battery to cool said battery, said process comprising:

measuring charge/discharge current of said battery;
measuring battery temperature of said battery;
measuring ambient temperature surrounding said battery; and
calculating the difference between said battery temperature and said ambient temperature as a differential temperature and calculating a calorific value of said battery on the basis of internal resistance of said battery and said charge/discharge current, and controlling air flow of said cooling unit on the basis of said differential temperature and said calorific value.

* * * * *